(12) United States Patent
Tomita et al.

(10) Patent No.: US 8,676,499 B2
(45) Date of Patent: Mar. 18, 2014

(54) MOVEMENT GUIDANCE SYSTEM, MOVEMENT GUIDANCE DEVICE, MOVEMENT GUIDANCE METHOD, AND COMPUTER PROGRAM

(75) Inventors: Masatoshi Tomita, Sapporo (JP); Masashi Takeuchi, Sapporo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/598,138

(22) Filed: Aug. 29, 2012

(65) Prior Publication Data

US 2013/0054136 A1 Feb. 28, 2013

(30) Foreign Application Priority Data

Aug. 29, 2011 (JP) ................................. 2011-185577

(51) Int. Cl.
*G01C 21/00* (2006.01)
*G01C 21/30* (2006.01)

(52) U.S. Cl.
USPC ............ 701/428; 701/431; 701/411; 701/466

(58) Field of Classification Search
USPC .................. 701/428, 411, 466, 431
See application file for complete search history.

(56) References Cited

U.S. PATENT DOCUMENTS

| 5,835,881 A * | 11/1998 | Trovato et al. ................. 701/431 |
| 5,904,728 A | 5/1999 | Tamai et al. |
| 5,928,308 A * | 7/1999 | Nanba et al. ................... 701/428 |
| 6,253,153 B1 | 6/2001 | Kantani et al. |
| 8,265,869 B2 * | 9/2012 | Katou ........................... 701/431 |
| 2007/0106459 A1 | 5/2007 | Nakayama et al. |
| 2009/0138193 A1* | 5/2009 | Katou ........................... 701/201 |
| 2009/0222202 A1* | 9/2009 | Kato .............................. 701/210 |

FOREIGN PATENT DOCUMENTS

| EP | 0 836 074 A2 | 4/1998 |
| JP | A 10-122893 | 5/1998 |
| WO | WO 2008/140168 A1 | 11/2008 |
| WO | WO 2008140168 A1 * | 11/2008 ........... G08G 1/0962 |

OTHER PUBLICATIONS

Jan. 3, 2013 European Search Report issued in EP 12 181 622.7.

* cited by examiner

*Primary Examiner* — Thomas Black
*Assistant Examiner* — Tyler Paige
(74) *Attorney, Agent, or Firm* — Oliff PLC

(57) ABSTRACT

Movement guidance systems, devices, methods, and programs set a guidance branch point on a guidance route. The systems, devices, methods, and programs acquire a position and a shape of the guidance branch point and a prior branch point, and determine whether the prior branch point is adjacent based on the acquired information. The prior branch point is adjacent when the prior branch point exists within a first predetermined distance from the guidance branch point and is connected with a road in a same direction as the guidance branch point. When it is determined that the prior branch point is adjacent, the systems, devices, methods, and programs complete verbal guidance for the guidance branch point at a timing at which the movable body is located at a guidance end point that is located a second predetermined distance before the prior branch point.

17 Claims, 8 Drawing Sheets

FIG. 2

| GUIDANCE CANDIDATES (CONTENTS OF AUDIO TO BE UTTERED) | TIME REQUIRED TO OUTPUT | GUIDANCE END POINT |
|---|---|---|
| TO THE LEFT (RIGHT) DIRECTION AHEAD. (NO ADJACENT PRIOR BRANCH POINT LOCATED) | 3 SEC. | POSITION BY PREDETERMINED DISTANCE BEFORE GUIDANCE BRANCH POINT |
| TO THE LEFT (RIGHT) DIRECTION AT THE FURTHER BRANCH. (ADJACENT PRIOR BRANCH POINT LOCATED) | 4 SEC. | POSITION BY PREDETERMINED DISTANCE BEFORE ADJACENT PRIOR BRANCH POINT |
| ... | ... | ... |

FIG. 3

NO ADJACENT PRIOR BRANCH POINT LOCATED

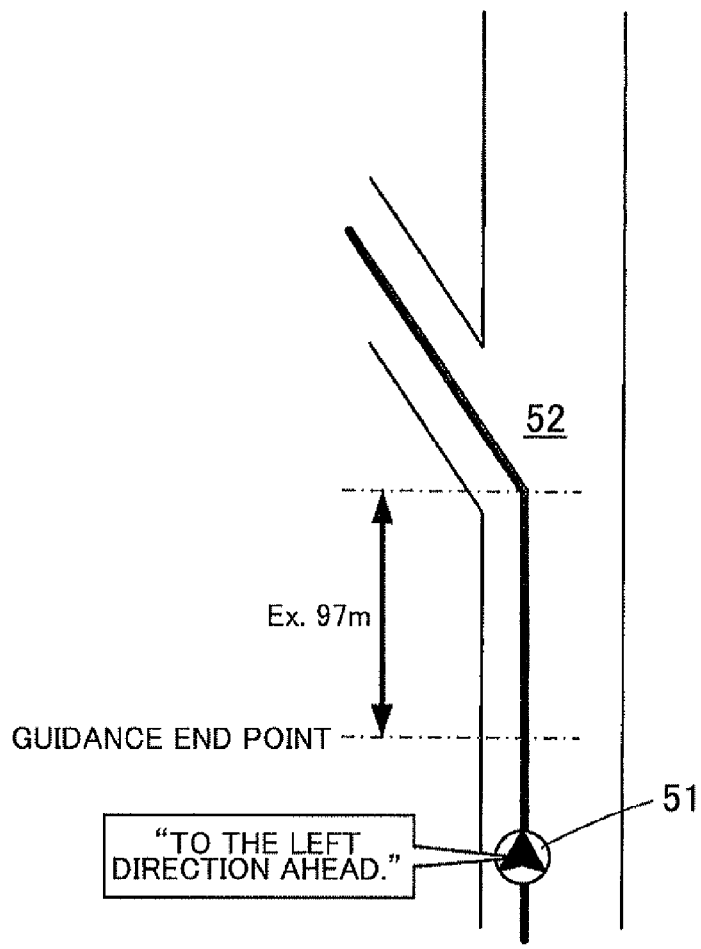

MOVEMENT GUIDANCE SYSTEM, MOVEMENT GUIDANCE DEVICE, MOVEMENT GUIDANCE METHOD, AND COMPUTER PROGRAM

INCORPORATION BY REFERENCE

The disclosure of Japanese Patent Application No. 2011-185577, filed on Aug. 29, 2011, including the specification, drawings and abstract thereof, is incorporated herein by reference in its entirety.

BACKGROUND

1. Related Technical Fields

Related technical fields include movement guidance systems, movement guidance devices, movement guidance methods, and computer programs that guide a movement of a movable body based on a guidance route.

2. Related Art

In recent years, many vehicles are mounted with navigation devices that are capable of guiding drivers to easily arrive at desired destinations through travel guidance of a vehicle. The navigation devices here are devices, which can detect a current position of the vehicle using a GPS receiver and the like and acquire map data corresponding to the current position through a storage medium such as a DVD-ROM and a HDD or a network, and display a map on a liquid crystal monitor. Further, the navigation devices are provided with a route search function that searches for an appropriate route from a departure point to a desired destination when the desired destination has been inputted. Thereafter, the navigation devices display a guidance route set based on the search result on a display screen and, if the vehicle approaches a branch point (hereinafter, referred to as a guidance branch point) target for the guidance such as a right turn, a left turn, and the like, provide the guidance using audio or a display screen in order to guide the user to the desired destination. In addition, in recent years, some cellular phones, PDAs (Personal Digital Assistant), personal computers, and the like include the same function as the aforementioned navigation devices. Also, it is possible to provide the guidance for pedestrians or two wheels besides vehicles.

Here, if providing the guidance such as a right turn, a left turn, or the like at the guidance branch point, it is necessary to make the user correctly determine the guidance branch point. Especially, if there is a branch point that is adjacent to the guidance branch point and connected to a road in the same direction (for example, diagonally forward left) as the guidance branch point, in order to avoid that the guidance branch point is misidentified with the branch point, it is important to set an appropriate timing to provide the guidance for guidance branch point. For example, Japanese Patent Application; Publication No. JP-A-10-122893 proposes a technology that, if there is a branch point connected with a road in the same direction as the guidance branch point within a predetermined distance before the guidance branch point, sets the timing to provide the guidance for guidance branch point to a timing to pass the branch point.

SUMMARY

However, only by setting the timing to provide the guidance for guidance branch point to the timing to pass the prior branch point, as the technology recited in Japanese Patent Application; Publication No. JP-A-10-122893, the guidance branch point can be still misidentified.

In order to solve the aforementioned conventional problem, exemplary implementations of the broad inventive principles described herein provide a movement guidance system, a movement guidance device, a movement guidance method, and a computer program that do not make the user misidentify the guidance branch point even in a situation in which the user is likely to misidentify the guidance branch point, by setting a timing to complete the utterance of the guidance for guidance branch point to an appropriate timing.

Exemplary implementations provide movement guidance systems, devices, methods, and programs that set a guidance route for a movable body and a guidance branch point on the guidance route. The systems, devices, methods, and programs acquire a position and a shape of the guidance branch point, acquire a position and a shape of a prior branch point from the stored branch point data, and determine whether the prior branch point is adjacent based on the acquired information. The prior branch point is adjacent when the prior branch point exists within a first predetermined distance from the guidance branch point and is connected with a road in a same direction as the guidance branch point. When it is determined that the prior branch point is adjacent, the systems, devices, methods, and programs complete verbal guidance for the guidance branch point at a timing at which the movable body is located at a guidance end point that is located a second predetermined distance before the prior branch point.

As used herein, the term "movable body" includes pedestrians and two wheels in addition to vehicles. The term "guidance branch point" corresponds to a branch point target for the guidance such as a right turn, a left turn instruction, or the like when guiding the movement of the movable body along the guidance route.

According to exemplary implementations, if the adjacent prior branch point connected with a road in the same direction as the guidance branch point exists in the vicinity of the guidance branch point, the guidance for guidance branch point is provided such that the utterance of the guidance completes at a timing at which the movable body is located at the guidance end point that is a position by a predetermined distance before the adjacent prior branch point. Therefore, it is possible to prevent misidentification of the guidance branch point even when the guidance branch point is likely to be misidentified with another branch point.

According to exemplary implementations, the guidance for guidance branch point includes a phrase determining that the guidance branch point is a branch point located on a foremost side in the moving direction of the movable body among a plurality of branch points consecutively existing ahead of the movable body. Therefore, it is possible to make the user correctly determine the guidance branch point among the consecutive branch points even when branch points in the same shape are consecutively located.

According to exemplary implementations, if the movable body is located on a main lane of a highway, the guidance for guidance branch point is provided such that the utterance of the guidance completes at a timing at which the movable body is located at the guidance end point that is a position by a predetermined distance before the adjacent prior branch point. Therefore, it is possible to prevent a misidentification of the guidance branch point especially in a situation in which the movable body moves at high speed and many branch points having similar shapes exist.

According to exemplary implementations, if the distance from the guidance branch point to the adjacent prior branch point is short, the guidance end point is changed toward the departure point side of the guidance route. Therefore, it is possible to ensure a certain time period after the guidance completes and before the movable body reaches the guidance branch point. As a result, it is possible to reduce possibility of misidentification of the guidance branch point and to make the user appropriately perform a preparation operation for the guidance branch point.

According to exemplary implementations, the guidance end point is changed especially if the distance from the guidance branch point to the adjacent prior branch point is equal to or shorter than the differential distance between the distance from the guidance branch point to the preparation point and the second distance. Therefore, in a situation in which it is predicted that the user cannot perform the preparation operation for the guidance branch point appropriately if the guidance end point is set to a position by the second distance before the adjacent prior branch point, it is possible to correct the guidance end point to an appropriate position.

According to exemplary implementations, it is possible to change the guidance end point to a position at which the user can appropriately perform the preparation operation for the guidance branch point after the guidance completes and before the movable body reaches the guidance branch point.

According to exemplary implementations, if the consecutive prior branch point connected with a road in the same direction as the guidance branch point does not exist before the guidance end point, the guidance for guidance branch point is provided such that the utterance of the guidance completes at a timing at which the movable body is located at the guidance end point that is a position by the predetermined distance before the adjacent prior branch point. Therefore, it is possible to set the guidance end point to an appropriate position based on the adjacent prior branch point except the situation in which the possibility of misidentification of the guidance branch point increases by setting the guidance end point to the position based on the adjacent prior branch point.

According to exemplary implementations, especially if the consecutive prior branch point connected with a road in the same direction as the guidance branch point does not exist within the moving distance of the movable body required to provide the utterance of the guidance for guidance branch point from the guidance end point, the guidance for guidance branch point is provided such that the utterance of the guidance completes at a timing at which the movable body is located at the guidance end point that is a position by the predetermined distance before the adjacent prior branch point. Therefore, it is possible to avoid the situation in which the possibility of misidentification of the guidance branch point increases by setting the guidance end point to the position based on the adjacent prior branch point.

BRIEF DESCRIPTION OF THE DRAWINGS

FIG. 2 illustrates an example of a guidance phrase condition table.

FIG. 3 illustrates a guidance end point defined in the guidance phrase condition table.

DETAILED DESCRIPTION OF EXEMPLARY IMPLEMENTATIONS

Figure 1:
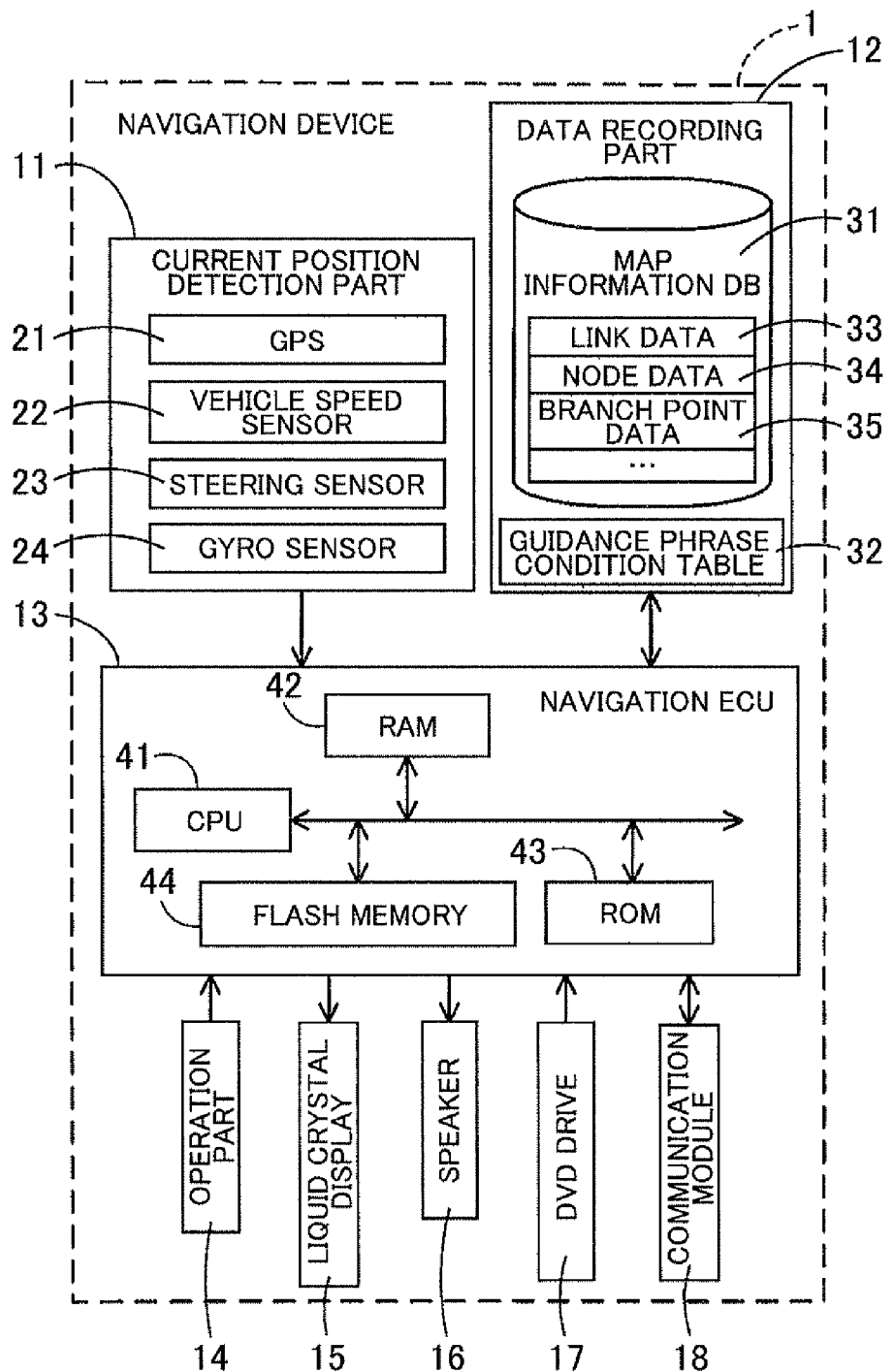
FIG. 1 is a block diagram showing a navigation device according to the present example.

Hereinafter, a specific example of a movement guidance system and a movement guidance device that is implemented in a navigation device will be explained in detail with reference to the drawings. First, a schematic structure of a navigation device 1 according to the present example will be explained with reference to FIG. 1. FIG. 1 is a block diagram showing the navigation device 1 according to the present example.

As shown in FIG. 1, the navigation device 1 according to the present example is composed of: a current position detection part 11 that detects a current position of a vehicle mounted with the navigation device 1; a data recording part 12 in which various kinds of data is recorded; a controller (e.g., navigation ECU (electric control unit) 13) that performs various kinds of arithmetic processing based on input information; an operation part 14 that accepts an operation of a user; a liquid crystal display 15 that displays a map and facility information regarding facilities in the vicinity of the vehicle to a user, a speaker 16 that outputs audio guidance regarding route guidance; a DVD drive 17 that reads out a DVD serving as a storage medium; a communication module 18 that performs communication with information centers such as a probe center, a VICS® (Vehicle Information and Communication System) center, and the like.

Hereinafter, the respective components composing the navigation device 1 are explained.

The current position detection part 11 includes at least one of a GPS 21, a vehicle speed sensor 22, a steering sensor 23, a gyro sensor 24, and the like, and can detect a current position and a bearing of the vehicle, a traveling speed of the vehicle, a current time, and the like. Here, in particular, the vehicle speed sensor 22 is a sensor for detecting a moving distance and a speed of the vehicle, generates pulses in accordance with a rotation of drive wheels of the vehicle, and outputs pulse signals to the navigation ECU 13. Subsequently, by counting the number of generated pulses, the navigation ECU 13 calculates a rotation speed of the drive wheels and the moving distance. Note that the navigation device 1 is not required to be provided with all the aforementioned four kinds of sensors, and the navigation device 1 may be provided with only one or a plurality of kinds of sensors among them.

The data recording part 12 is a storage medium provided with a hard disk (not shown) serving as an external storage device and a recording medium, and a recording head (not shown) serving as a driver for reading a map information DB 31, a guidance phrase condition table 32, a predetermined program, and the like, which are recorded in the hard disk, and writing predetermined data in the hard disk. The data recording part 12 may be composed of a memory card, or an optical disk such as a CD, a DVD, and the like, in place of the hard disk.

The map information DB 31 is a storage unit storing, for example, link data 33 regarding roads (links), node data 34 regarding node points, branch point data 35 regarding branch points, point data regarding points of facilities and the like, map display data for displaying a map, route search data for searching for routes, point search data for searching for points, and the like.

As the link data 33, for example, a link ID identifying the represented link, terminal point node information determining nodes located at the terminal points of the represented link, the road type and the number of lanes of the road structured by the represented link, and the like are stored. As the node data 34, a node ID identifying the represented node, a positional coordinate of the represented node, connected node information determining a connected node connected to the represented node through a link, and the like are stored. In addition, as the branch point data 35, corresponding node information determining a node forming the represented branch point (an intersection), connected link information determining links (hereinafter, referred to as connected links) connected to the represented branch point, feature information regarding a traffic light and a stop line installed in the vicinity of the branch point, and the like are stored.

The navigation ECU 13 determines, based on the data stored in the map information DB 31 as mentioned later, a guidance branch point ahead of the vehicle in the travel direction and a branch point (hereinafter, referred to as a prior branch point) existing on a departure point side of a guidance route with respect to the guidance branch point. Further, the navigation ECU 13 determines, as an adjacent prior branch point, a prior branch point existing within a predetermined distance (for example, within 300 m) from the guidance branch point and connected with a road in the same direction (for example, diagonally forward left) as the guidance branch point among prior branch points. Note that the guidance branch point is a branch point that is target for providing guidance such as a right turn and a left turn instruction and the like when the navigation device 1 provides travel guidance along the guidance route being set in the navigation device 1.

The guidance phrase condition table 32 is a table, in which, regarding the guidance for guiding guidance branch points, the contents of a phrase to be uttered, a time required to output the utterance of the guidance, a position where the utterance of the guidance is required to complete (that is, a position where the guidance for guidance branch point is required to complete before the vehicle reaches), and the like are associated each other and stored.

Figure 4:
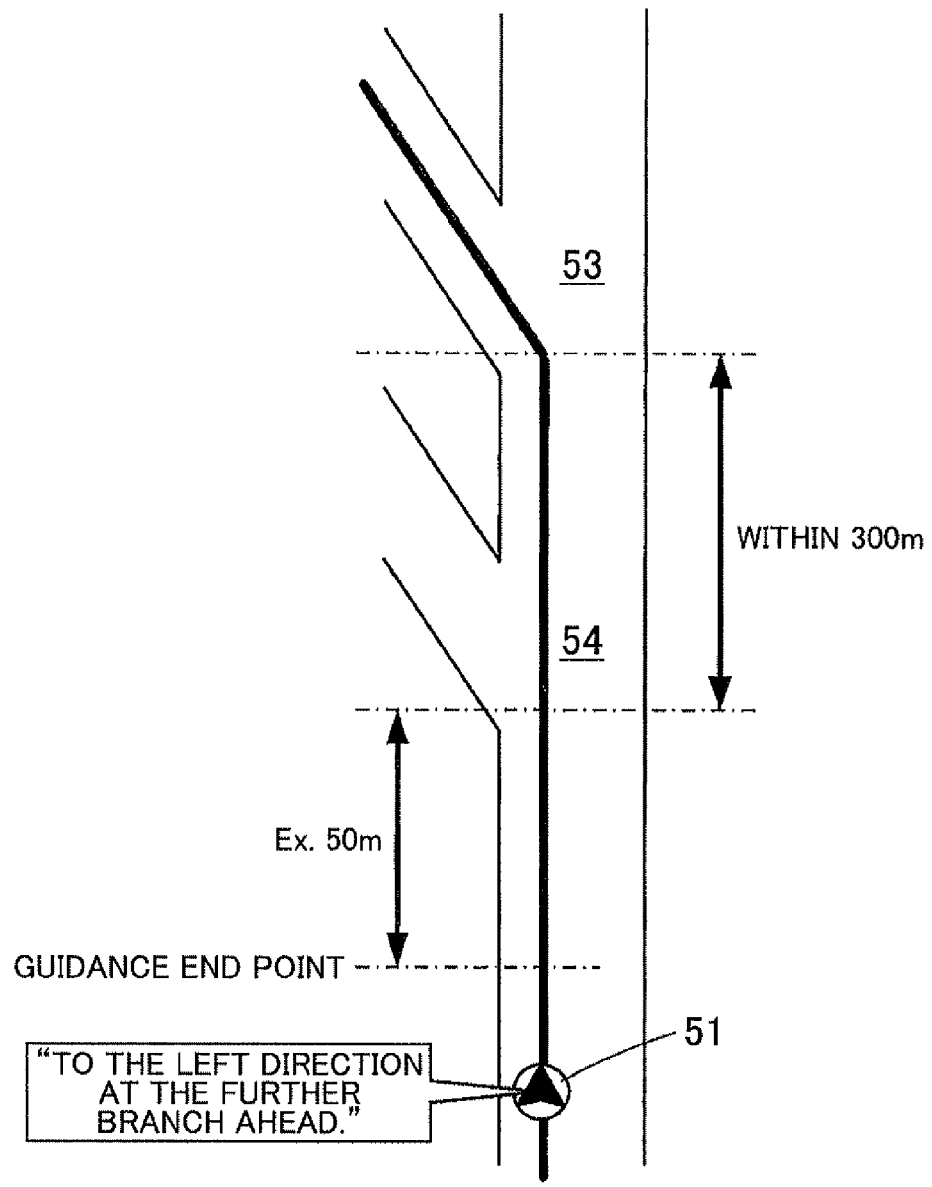
FIG. 4 illustrates the guidance end point defined in the guidance phrase condition table.

Hereinafter, the guidance phrase condition table 32 is explained in detail with reference to specific examples. FIG. 2 illustrates an example of the guidance phrase condition table 32. FIGS. 3 and 4 illustrate the guidance end point defined in the guidance phrase condition table 32 shown in FIG. 2. The guidance shown in FIG. 2 indicates the guidance to be outputted when the guidance for a right turn or a left turn at the guidance branch point is provided while traveling along the main lane of a highway among a plurality of guidance provided at a guidance branch point. The branch point on the main lane of the highway includes, for example, a branch point from which the road is diverted to each direction, a branch point for entering an exit of an interchange, an entrance of a PA or a SA, and the like. The contents of the phrase to be uttered when the guidance for guidance branch point is provided while traveling on the main lane of the highway varies depending on whether an adjacent prior branch point exists. For example, if the adjacent prior branch point does not exist, a guidance phrase "To the left (right) direction ahead." is basically outputted. If the adjacent prior branch point exists, a guidance phrase "To the left (right) direction at the further branch." is basically outputted. However, if another prior branch point connected with a road in the same direction (for example, diagonally forward left) as the guidance branch point further exists within a predetermined distance before the adjacent prior branch point, the guidance phrase "To the left (right) direction ahead" is irregularly outputted even if the adjacent prior branch point exits.

If the guidance "To the left (right) direction ahead" is provided here, the utterance of the guidance starts and completes such that the predetermined preparation time (for example, 3.5 sec.) for vehicle operation is reserved after the guidance for guidance branch point completes and before the vehicle enters the guidance branch point. That is, for the guidance "To the left (right) direction ahead," the guidance end point is set to a position by a predetermined distance before the guidance branch point (a position where the vehicle is located the predetermined preparation time before the vehicle reaches the guidance branch point). Consequently, as shown in FIG. 3, if a vehicle 51 travels on the main lane of the highway at 100 km/h and a guidance branch point 52 exists ahead of the vehicle 51 in the travel direction, the guidance end point is set to a position 97 m before the guidance branch point 52. As a result, the user receiving the guidance is able to clearly determine the guidance branch point 52 and also perform preparation operations (for example, a lane change, lighting of the directional indicator) of the vehicle before entering the guidance branch point 52.

On the other hand, if the guidance "To the left (right) direction at the further branch." is provided, the utterance of the guidance starts and completes such that the adjacent prior branch point and the guidance branch point can be easily identified after the guidance for guidance branch point has completed. That is, for the guidance "To the left (right) direction at the further branch," the guidance end point is set to a position by a predetermined distance (that is a fixed value, for example, 50 m) before the adjacent prior branch point. Consequently, as shown in FIG. 4, if the vehicle 51 travels on the main lane of the highway at 100 km/h and the guidance branch point 53 and the adjacent prior branch point 54 exist ahead of the vehicle 51 in the travel direction, the guidance end point is set to a position 50 m before the adjacent prior branch point 54. The guidance phrase "To the left (right) direction at the further branch." includes "at the further branch" that is a phrase to determine that the guidance branch point is a branch point located on the foremost side in the travel direction among a plurality of consecutive branch points (the adjacent prior branch point 54 and the guidance branch point 53 in FIG. 4) ahead of the vehicle in the travel direction. Therefore, the user receiving the guidance is able to clearly determine the guidance branch point 53 even if the adjacent prior branch point 54 exists. As described later, if the distance between the adjacent prior branch point and the guidance branch point is especially short, the guidance end point is corrected to the side (the departure point side) before the basic position (the position 50 m before the adjacent prior branch point).

Other kinds of guidance are stored in the guidance phrase condition table 32 in the same manner. The guidance direction at the guidance branch point includes a diagonally forward left (right) direction, a diagonally backward left (right) direction, and the like in addition to the left (right) direction. Also, the time required to output guidance varies depending on the guidance direction. In addition, the respective values (97 m, 50 m, and the like) to determine the guidance end point can be changed as appropriate.

The navigation ECU 13 sets appropriate guidance for guidance branch point based on the shape of the guidance route, the positional information of the branch point installed on the guidance route, the guidance phrase condition table 32, and the like, and outputs the guidance such that the guidance completes before the vehicle reaches the guidance end point associated with the set guidance for guidance branch point, as described later.

On the other hand, the navigation ECU 13 is an electronic control unit that performs overall control of the navigation device 1. The navigation ECU 13 is provided with: a CPU 41 serving as a computing device and a control device; internal storage mediums such as a RAM 42 used as a working memory when the CPU 41 executes various computing processing and in which route data when the route has been calculated, and the like, are stored, a ROM 43 which records a program for control, and a branch point guidance processing program described later (refer to FIGS. 5 and 6), and a flash memory 44 which records a program read from the ROM 43; and the like. (Note: the term "storage medium" as used herein is not intended to encompass transitory signals.) In addition, the navigation ECU 13 functions as various kinds of units serving as processing algorithms. For example, a guidance route setting unit sets a guidance route and one or more guidance branch points from a departure point (for example, a current position of a vehicle) to a destination to guide the movement of the vehicle (a movable body). A guidance branch point acquiring unit acquires the position and the shape of one of the guidance branch points. A prior branch point acquiring unit acquires the position and the shape of the prior branch point existing on the departure point side of the guidance route with respect to the guidance branch point. An adjacent prior branch point determining unit determines based on the position and the shape of the guidance branch point and the position and the shape of the prior branch point whether the adjacent prior branch point exists, the adjacent prior branch point being a prior branch point existing by a predetermined first distance (for example, within 300 m) from the guidance branch point and connected with a road in the same direction as the guidance branch point. A branch point guidance unit, if the adjacent prior branch point determining unit determines that the adjacent prior branch point exists, provides the guidance for guidance branch point such that an utterance of the guidance completes at a timing at which the vehicle is located at the guidance end point that is a position by a predetermined second distance (for example, 50 m) before the adjacent prior branch point. A road attribute acquiring unit acquires the road attribute of the road on which the vehicle is located. A moving speed acquiring unit acquires the current speed of the vehicle. A preparation point acquiring unit acquires, based on the current speed of the vehicle, a preparation point that is a position where the vehicle will reach a predetermined time before the vehicle reaches the guidance branch point. A consecutive prior branch point determining unit determines whether a consecutive prior branch point exists, the consecutive prior branch point being a prior branch point existing within a predetermined fourth distance (for example, within 300 m) from the guidance end point and connected with a road in the same direction as the guidance branch point. A required moving distance acquiring unit acquires a required moving distance based on the moving speed of the vehicle, the required moving distance being a moving distance of the vehicle required to provide the utterance of the guidance for guidance branch point.

The operation part 14 is operated for inputting a departure point as a travel starting point and a destination as a travel ending point, and is composed of various keys and a plurality of operation switches (not shown) such as buttons and the like. The navigation ECU 13 performs control so as to execute the corresponding kinds of operations based on switch signals outputted through pressing the respective switches and the like. The operation part 14 may be composed of a touch panel installed in front of the liquid crystal display 15. The operation part 14 may be composed of a microphone and a voice recognition device.

On the liquid crystal display 15, a map image including roads, traffic information, operation guidance, an operation menu, key guidance, a guidance route from the departure point to the destination, guidance information along the guidance route, news, weather forecast, time, E-mail, TV programs, and the like are displayed. Especially, in the present example, when the guidance branch point exists within a predetermined distance (for example, 300 m) in the forward direction of the travel direction of the vehicle, an enlarged map of the vicinity of the guidance branch point and the travel direction of the vehicle at the guidance branch point are displayed.

The speaker 16 outputs audio guidance for traveling the guidance route based on an instruction from the navigation ECU 13, and the traffic information. Especially, in the present example, when a guidance branch point exists ahead of the vehicle in the travel direction, audio guidance for guidance branch point is outputted at a predetermined guidance start timing based on the guidance contents (for example, if the audio guidance "To the left direction ahead" is outputted, at a timing at which the guidance completes at least at a position by a predetermined distance before the guidance branch point (refer to FIG. 3)).

The DVD drive 17 is a drive capable of reading data stored in the recording medium such as a DVD, a CD, and the like. The DVD drive 17 plays music and images, updates the map information DB 31 based on the read data, and the like.

The communication module 18 is a communication device for receiving the traffic information including congestion information, regulation information, traffic accident information, and the like, which is transmitted from a traffic information center such as a VICS center, a probe center, and the like. The communication module 18 corresponds to a cellular phone and a DCM for example.

Figure 5:
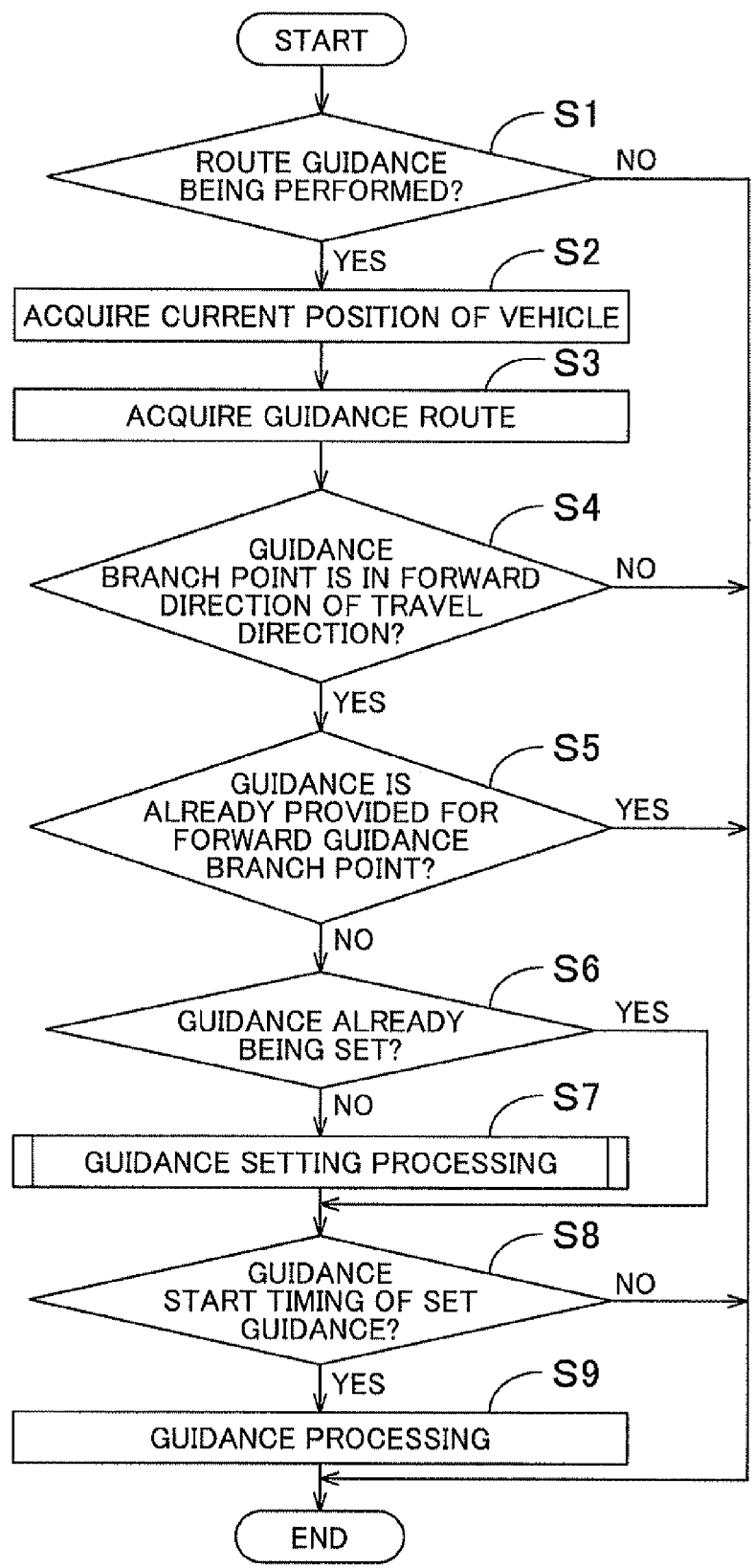
FIG. 5 is a flowchart of a branch point guidance processing algorithm according to the present example.
Figure 6:
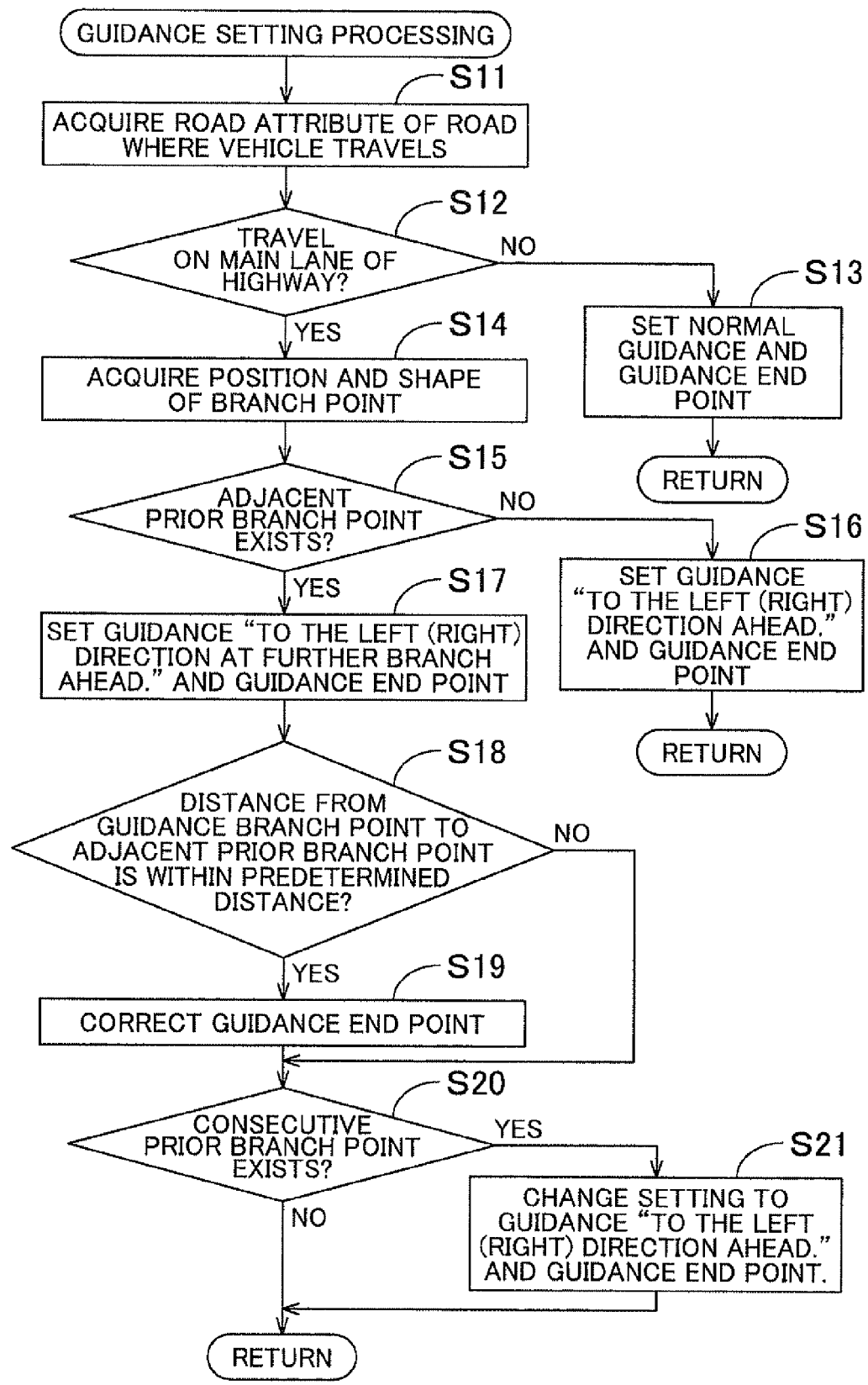
FIG. 6 is a flowchart of a sub-processing algorithm of guidance setting processing according to the present example.

Subsequently, an exemplary branch point guidance processing method will be described with reference to the process algorithms shown in FIGS. 5 and 6. The process algorithms may be implemented in the form of one or more computer programs stored in, for example, the data recording part 12, RAM 42, ROM 43, and/or flash memory 44 included in the navigation device 1, and executed by the controller (e.g., navigation ECU 13). Although the structure of the above-described navigation device 1 is referenced in the description of the process, the reference to such structure is exemplary, and the method need not be limited by the specific structure of the navigation device 1.

The branch point guidance processing may be repeatedly executed at predetermined intervals (for example, each detection period of the current position of the vehicle) after the ACC power supply of the vehicle is switched on, and provides guidance toward the guidance branch points on the guidance route.

First, at Step (hereinafter, referred to as S) 1 of the branch point guidance processing program, the CPU 41 determines whether route guidance based on the guidance route set in the navigation device 1 is being performed. The guidance route here is a recommended route from the departure pint (for example, the current position of the vehicle) to the destination selected by the user. The guidance route is set based on the result of the route search processing. In addition, the route search processing is executed in a known Dijkstra method or the like using the link data 33 and the node data 34 stored in the map information DB 31, the traffic information acquired from the VICS center, and the like.

If it is determined that the route guidance based on the guidance route set in the navigation device 1 is being performed (S1: YES), the procedure proceeds to S2. On the other hand, if it is determined that the route guidance based on the guidance route set in the navigation device 1 is not being performed (S1: NO), the CPU 41 terminates the branch point guidance processing program.

At S2, the CPU 41 acquires the current position of the vehicle based on the detection result of the current position detection part 11. In addition, the CPU 41 performs map matching processing to determine the current position of the vehicle on the map data. Further, the current position of the vehicle is preferably determined with precision using a high accuracy location technology. The high accuracy location technology is a technology that enables to detect the travel lane and the vehicle position with precision by detecting white lines and/or road surface paint information captured by a camera installed at the rear side of the vehicle with image recognition and matching the white lines and/or the road surface paint information with a previously-stored map information DB. The high accuracy location technology is publicly known; therefore, detailed explanation is not described.

Next, at S3, the CPU 41 acquires the guidance route (including the guidance branch points on the guidance route) being set in the navigation device 1.

Subsequently, at S4, the CPU 41 determines based on the current position of the vehicle acquired at S2 and the guidance route acquired at S3 whether a guidance branch point exists within a predetermined distance (for example, within 1.47 km) in the forward direction of the travel direction of the vehicle. The guidance branch point is a branch point that is target for the guidance such as a right turn, left turn instruction, or the like when the navigation device 1 provides guidance for travel according to the guidance route set in the navigation device 1 as mentioned above.

If it is determined that the guidance branch point exists within the predetermined distance in the forward direction of the travel direction of the vehicle (S4: YES), the procedure proceeds to S5. On the other hand, if it is determined that the guidance branch point does not exist within the predetermined distance in the forward direction of the travel direction of the vehicle (S4: NO), the CPU 41 terminates the branch point guidance processing program.

At S5, the CPU 41 determines whether the guidance toward the guidance branch point located in the forward direction of the travel direction of the vehicle is already provided. At S5, it is determined whether voice guidance instructing a right turn, a left turn, or the like at the guidance branch point among a plurality of guidance toward the guidance branch point is already provided.

If it is determined that the guidance toward the guidance branch point located in the forward direction of the travel direction of the vehicle is already provided (S5: YES), the CPU 41 terminates the branch point guidance processing program. On the other hand, if it is determined that the guidance toward the guidance branch point located in the forward direction of the travel direction of the vehicle is not provided (S5: NO), the procedure proceeds to S6.

At S6, the CPU 41 determines whether the guidance toward the guidance branch point located in the forward direction of the travel direction of the vehicle is already set by guidance setting processing to be executed at S7.

If it is determined that the guidance toward the guidance branch point located in the forward direction of the travel direction of the vehicle is already set (S6: YES), the procedure proceeds to S8. On the other hand, if it is determined that the guidance toward the guidance branch point located in the forward direction of the travel direction of the vehicle is not set (S6: NO), the procedure proceeds to S7.

At S7, the CPU 41 executes the guidance setting processing (FIG. 6), which is described later. The guidance setting processing is processing to set appropriate guidance toward the guidance branch point located in the forward direction of the travel direction of the vehicle based on the position and the shape of the branch point, as described later.

Next, at S8, the CPU 41 determines whether it is the guidance start timing that is the timing to start the guidance for guidance branch point set at S7. The guidance start timing is set such that the guidance completes before the vehicle reaches the guidance end point associated with the guidance for guidance branch point set at S7 (for example, the guidance completes when the vehicle reaches the guidance end point). Specifically, the guidance start timing is set based on the current speed of the vehicle, the time required to output the guidance, and the guidance end point. The guidance end point is set by the guidance setting processing (FIG. 6) based on the guidance phrase condition table 32 (FIG. 2) together with the guidance content. The current speed of the vehicle is detected by the vehicle speed sensor 22. The time required to output the guidance is acquired from the guidance phrase condition table 32 (FIG. 2).

If it is determined that it is the guidance start timing to start the guidance for guidance branch point set at S7 (S8: YES), the procedure proceeds to S9. On the other hand, if it is determined that it is not the guidance start timing to start the guidance for guidance branch point set at S7 (S8: NO), the CPU 41 terminates the branch point guidance processing program.

At S9, the CPU 41 provides the guidance for guidance branch point corresponding to the guidance start timing at which the vehicle has reached. Specifically, the CPU 41 provides the guidance to determine the guidance branch point and to determine an exit direction at the guidance branch point of the vehicle (that is, guidance to determine an exit road to which the vehicle exits from the guidance branch point). For example, if the guidance "To the left (right) direction ahead" is set by the guidance setting processing at S7, and when the vehicle has reached the position by a predetermined distance before the guidance branch point, the phrase "To the left (right) direction ahead." is outputted from the speaker 16. On the other hand, if the guidance "To the left (right) direction at the further branch." is set by the guidance setting processing at S7, and when the vehicle has reached the position by a predetermined distance before the adjacent prior branch point, the phrase "To the left (right) direction at the further branch." is outputted from the speaker 16. Further, if the vehicle has reached within a predetermined distance (for example, 300 m) from the guidance branch point, the CPU 41 displays an enlarged map of the vicinity of the guidance branch point and the travel direction at the guidance branch point of the vehicle on the liquid crystal display 15.

As a result, it becomes possible to make the user correctly determine the guidance branch point and the road to which the vehicle exits from the guidance branch point.

Normally, the utterance of the guidance for guidance branch point starts such that the guidance completes when the vehicle reaches the guidance end point. However, the timing to start the utterance of the guidance may be set earlier, provided that the output of the guidance completes before the vehicle reaches the guidance end point. For example, in consideration of detection errors in the current position of the vehicle, the timing to start guidance may be set earlier by a distance of a possible maximum detection error (for example, 30 m).

Next, sub-processing of the guidance setting processing executed at S7 is explained with reference to FIG. 6. FIG. 6 is a flowchart of sub-processing program of the guidance setting processing.

First, at S11, the CPU 41 acquires the road attribute of the road where the vehicle is currently traveling, based on the current position of the vehicle detected at S2 and the link data 33 stored in the map information DB31.

Next, at S12, the CPU 41 determines whether the vehicle is traveling on the main lane of a highway, based on the road attribute of the road on which the vehicle is currently traveling, which is acquired at S11. The highway includes national highways, freeways, and the like.

If it is determined that the vehicle is traveling on the main lane of the highway (S12: YES), the procedure proceeds to S14. On the other hand, if it is determined that the vehicle is not traveling on the main lane of the highway (S12: NO), the procedure proceeds to S13.

At S13, the CPU 41 sets normal guidance for guidance branch point toward the guidance branch point located in the forward direction of the travel direction of the vehicle. The guidance for guidance branch point set at S13 is exemplified by the guidance indicating the distance from the vehicle to the guidance branch point and the guidance direction ("300 m (700 m) ahead, to the left (right) direction." and the like). The guidance using the traffic light installed at the branch point may be set. In addition, the guidance end point is also set based on the set guidance and the guidance phrase condition table 32 (FIG. 2). For example, if the guidance "300 m ahead, to the left (right) direction" is set, the guidance end point is set to the position 300 m before the guidance branch point. Thereafter, the procedure proceeds to S8.

On the other hand, at S14, the CPU 41 acquires the position and the shape of the guidance branch point located in the forward direction of the travel direction of the vehicle and the position and the shape of a prior branch point(s) existing before the guidance branch point, based on the link data 33 and the branch point data 35 stored in the map information DB 31. Specifically, the CPU 41 acquires the node coordinates of the respective branch points and the connection direction of the roads connected to the respective branch points.

Next, at S15, the CPU 41 determines whether the adjacent prior branch point exists toward the guidance branch point located in the forward direction of the travel direction of the vehicle, based on the positions and the shapes of the guidance branch point and the prior branch point(s) acquired at S14. Here, the adjacent prior branch point is a prior branch point that exists within a predetermined distance (a first distance) (for example, within 300 m) from the guidance branch point and is connected with a road in the same direction (for example, diagonally forward left) as the guidance branch point, as described before.

If it is determined that the adjacent prior branch point exists toward the guidance branch point located in the forward direction of the travel direction of the vehicle (S15: YES), the procedure proceeds to S17. On the other hand, if it is determined that the adjacent prior branch point does not exist toward the guidance branch point located in the forward direction of the travel direction of the vehicle (S15: NO), the procedure proceeds to S16.

At S16, the CPU 41 sets the guidance "To the left (right) direction ahead" toward the guidance branch point located in the forward direction of the travel direction of the vehicle. Further, the CPU 41 sets the guidance end point based on the set guidance and the guidance phrase condition table 32 (FIG. 2). Specifically, the CPU 41 sets the guidance end point to the position by a predetermined distance before the guidance branch point (more specifically, a position at which the vehicle is located the predetermined preparation time (for example, 3.5 sec.) before the vehicle reaches the guidance branch point). For example, if the vehicle travels on the main lane of a highway at 100 km/h, the guidance end point is set to the position 97 m before the guidance branch point (refer to FIG. 3). The current speed of the vehicle is detected by the vehicle speed sensor 22. Thereafter, the procedure proceeds to S8.

On the other hand, at S17, the CPU 41 sets the guidance "To the left (right) direction at the further branch." toward the guidance branch point located in the forward direction of the travel direction of the vehicle. Further, the CPU 41 sets the guidance end point based on the set guidance and the guidance phrase condition table 32 (FIG. 2). Specifically, the CPU 41 sets the guidance end point to the position by a predetermined fixed distance (a second distance) before (more specifically, 50 m before) the adjacent prior branch point (refer to FIG. 4).

Figure 7:
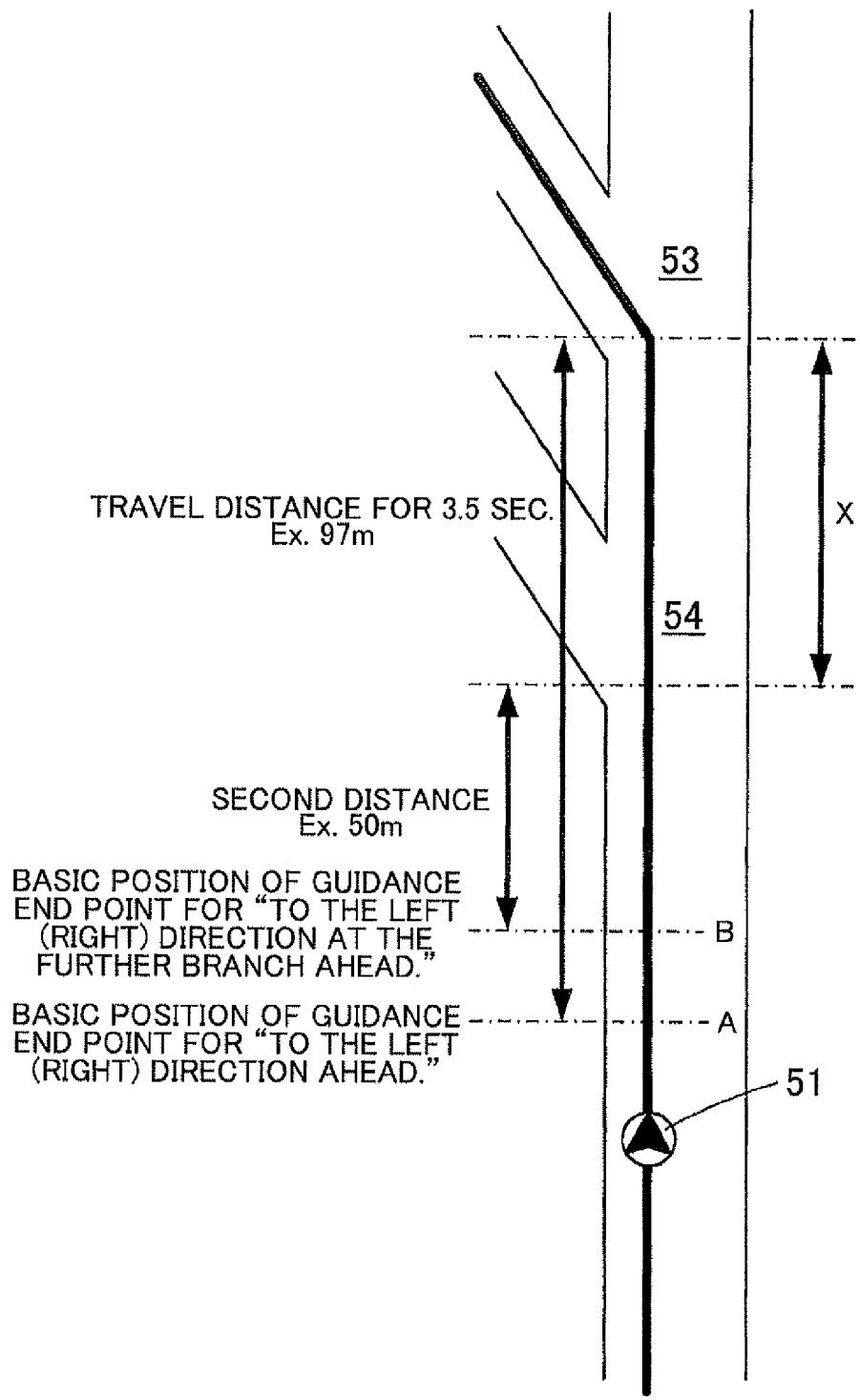
FIG. 7 illustrates a setting method of the guidance end point when an adjacent prior branch point exists.

Next, at S18, the CPU 41 determines whether the distance from the guidance branch point located in the forward direction of the travel direction of the vehicle to the adjacent prior branch point is equal to or shorter than a specially-short predetermined distance (a third distance). Here, the third distance is shorter than the first distance. More specifically, the third distance is a distance acquired by subtracting the second distance from the travel distance of the vehicle for the predetermined preparation time (for example, 3.5 sec). If the guidance "To the left (right) direction ahead" is set for the guidance branch point 53 as shown in FIG. 7, the guidance end point to be set will be a position A (a preparation point) where the vehicle is located the predetermined preparation time (for example, 3.5 sec.) before the vehicle 51 reaches the guidance branch point 53. In addition, if the guidance "To the left (right) direction at the further branch." is set for the guidance branch point 53, the guidance end point will be set at a position B by the second distance (for example, 50 m) before the adjacent prior branch point 54. Consequently, whether a distance X from the guidance branch point to the adjacent prior branch point is equal to or shorter than the third distance means the determination of whether the basic guidance end point to be set when the guidance "To the left (right) direction at the further branch." is set toward the guidance branch point is on the side of travel direction of the vehicle compared to the basic guidance end point to be set when the guidance "To the left (right) direction ahead" is set toward the guidance branch point.

If it is determined that the distance from the guidance branch point located in the forward direction of the travel direction of the vehicle to the adjacent prior branch point is equal to or shorter than the predetermined distance (the third distance) (S18: YES), the procedure proceeds to S19. On the other hand, if it is determined that the distance from the guidance branch point located in the forward direction of the travel direction of the vehicle to the adjacent prior branch point is not equal to or shorter than the predetermined distance (the third distance) (S18: NO), the procedure proceeds to S20.

At S19, the CPU 41 corrects the position of the guidance end point from the standard position set at S17. Specifically, the CPU 41 corrects from the position B which is by the second distance (for example, 50 m) from the adjacent prior branch point 54 to the position A (the preparation point) where the vehicle 51 is located the predetermined preparation time (for example, 3.5 sec.) before the vehicle 51 reaches the guidance branch point 53 (refer to FIG. 7). As a result, if the time period between when the guidance completes and when the vehicle reaches the guidance branch point is too short, it is possible to correct the guidance end timing earlier. Thereafter, the procedure proceeds to S20.

At S20, the CPU 41 further determines whether a consecutive prior branch point exists before the adjacent prior branch point, based on the guidance branch point acquired at S14 and the position and the shape of the prior branch point. Here, the consecutive prior branch point is a prior branch point that is within a predetermined distance (a fourth distance) before the guidance end point set at S17 or corrected at S19 and is connected with a road in the same direction (for example, diagonally forward left) as the guidance branch point. The fourth distance is a fixed distance (for example, 300 m) if the guidance end point is not corrected at S19, and a calculated value of a distance (for example, 194 m if the vehicle travels at 100 km/h) traveled by the vehicle for a time (for example, 7 sec.) required to provide the utterance of the guidance for guidance branch point if the guidance end point is corrected at S19. The "time required to provide the utterance of the guidance for guidance branch point" is preferable to be a time including a predetermined extra time in addition to the time actually required to provide the utterance.

Figure 8:
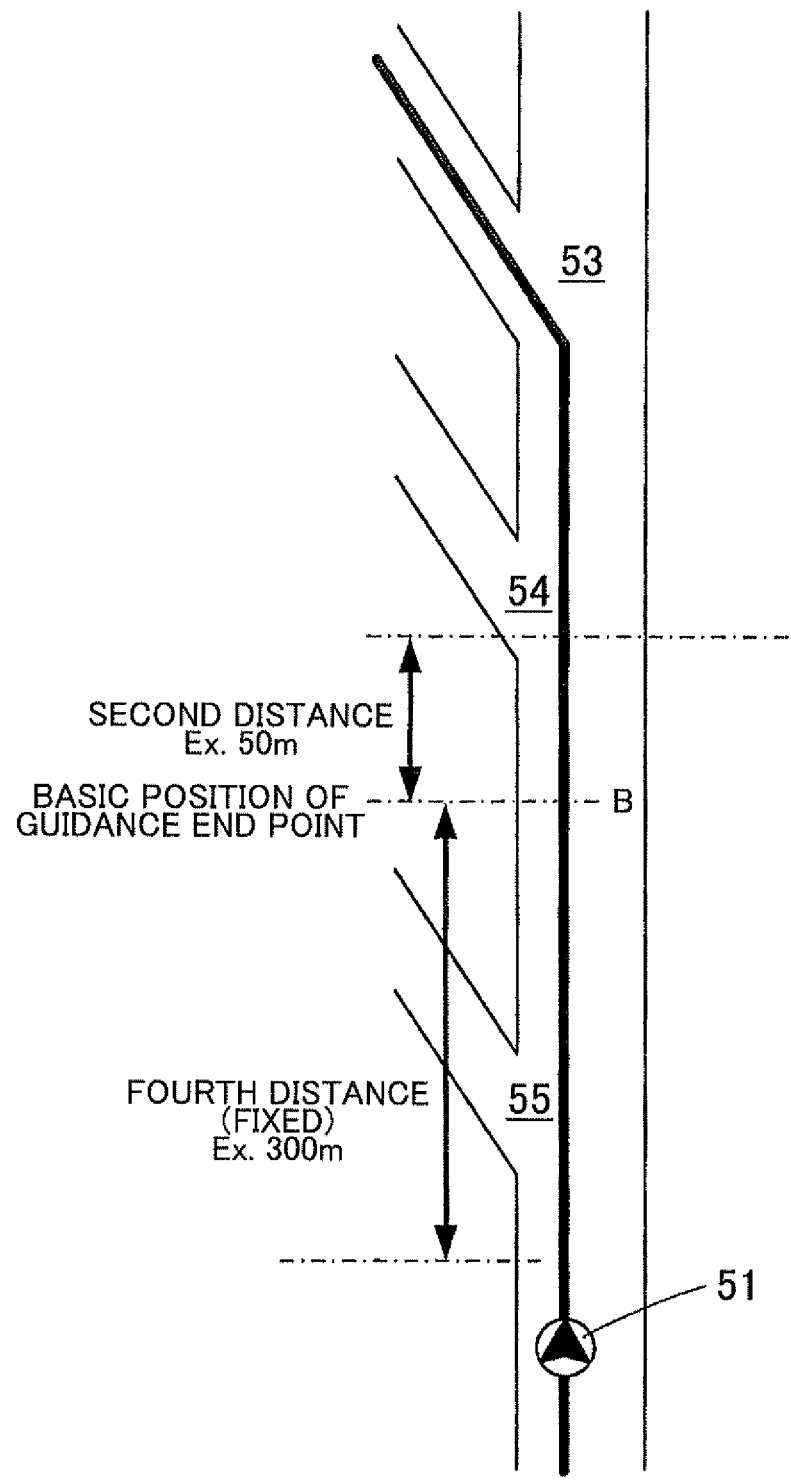
FIG. 8 illustrates a determination criterion of a consecutive prior branch point when the guidance end point has not been corrected.
Figure 9:
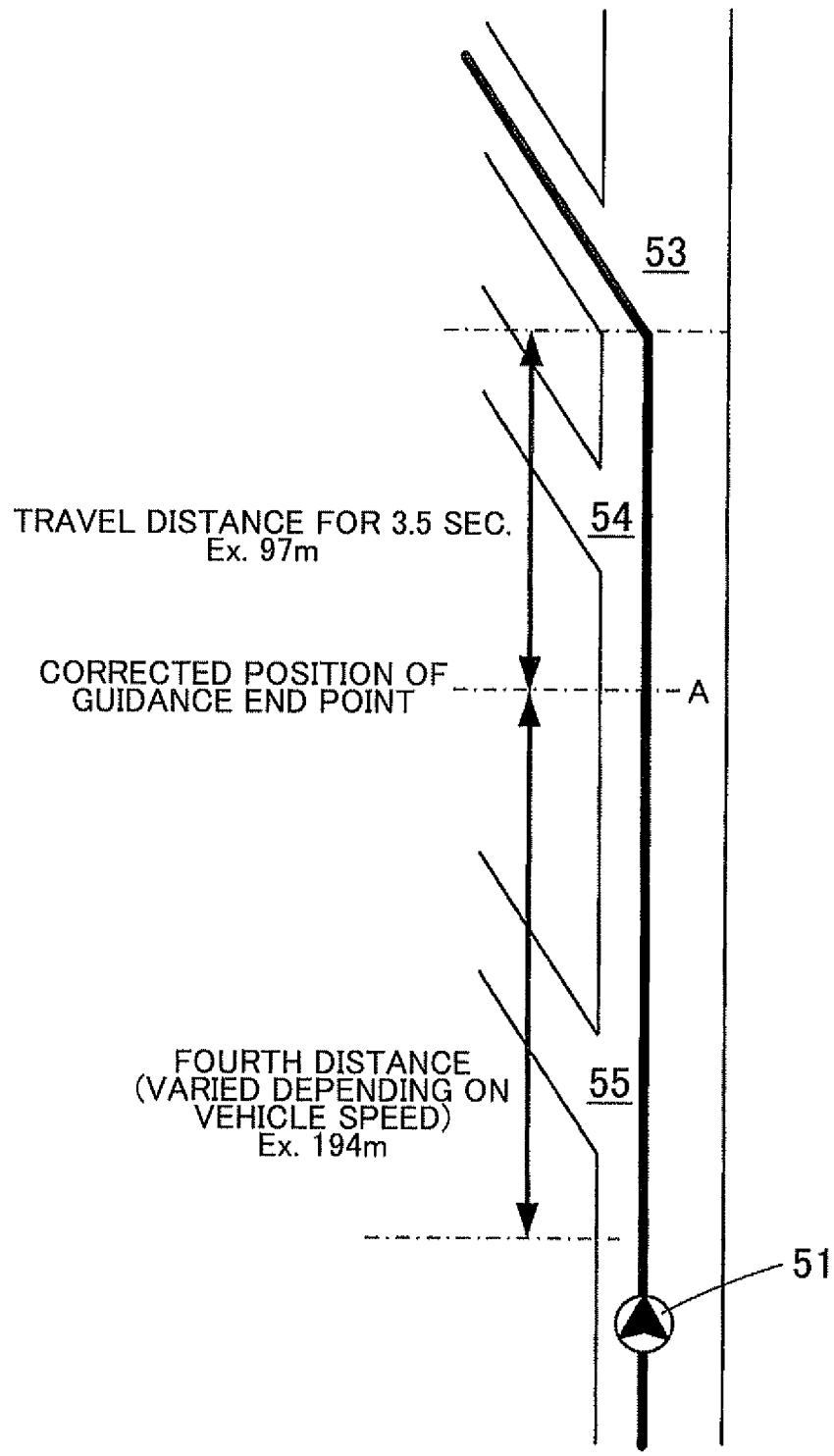
FIG. 9 illustrates a determination criterion of a consecutive prior branch point when the guidance end point has been corrected.

Consequently, if the guidance end point has not been corrected at S19, it is determined whether a prior branch point 55 connected with a road in the same direction (for example, diagonally forward left) as the guidance branch point 53 exists between the basic position of the guidance end point set at the position B that is by the second distance (for example, 50 m) before the adjacent prior branch point 54 and the position by the fixed fourth distance before the basic position of the guidance end point, as shown in FIG. 8. On the other hand, if the guidance end point has been corrected at S19, it is determined whether the prior branch point 55 connected with a road in the same direction (for example, diagonally forward left) as the guidance branch point 53 exists between the position of the guidance end point that has been corrected to the position A where the vehicle is located the predetermined preparation time (for example, 3.5 sec.) before the vehicle 51 reaches the guidance branch point 53 and the position by the fourth distance, which varies depending on the vehicle speed, before the guidance end point, as shown in FIG. 9.

If it is determined that the consecutive prior branch point exists toward the guidance branch point located in the forward direction of the travel direction of the vehicle (S20: YES), the procedure proceeds to S21.

At S21, the CPU 41 sets anew the guidance "To the left (right) direction ahead" as the guidance toward the guidance branch point located in the forward direction of the travel direction of the vehicle. That is, the CPU 41 changes the setting contents from the guidance "To the left (right) direction at the further branch." set at S17. Further, the CPU 41 sets anew the guidance end point based on the newly-set guidance and the guidance phrase condition table 32 (FIG. 2). Specifically, the CPU 41 sets anew the guidance end point to the position that is by a predetermined distance before the guidance branch point (more specifically, the position where the vehicle is located the predetermined preparation time (for example, 3.5 sec.) before the vehicle reaches the guidance branch point). The detail is the same as S16. Therefore, the explanation is not described. Thereafter, the procedure proceeds to S8. As a result, in a situation in which the guidance branch point is likely to be misidentified by setting the guidance end point to the position based on the adjacent prior point, the guidance end point can be set to a normal position based on the guidance branch point and normal guidance can be provided.

On the other hand, if it is determined that the consecutive prior branch point does not exist toward the guidance branch point located in the forward direction of the travel direction of the vehicle (S20: NO), the procedure proceeds to S8 without changing setting of the guidance toward the guidance branch point. In such case, the guidance for guidance branch point is provided using the guidance "To the left (right) direction at the further branch." set at S17. In addition, if the guidance end point is corrected at S19, it is determined based on the guidance end point after correction whether it is the guidance start timing (S8).

As explained in detail above, according the navigation device 1 in accordance with the present example, a movement guidance method using the navigation device 1, and a computer program executed in the navigation device 1; the positions and the shapes of a guidance branch point and a prior branch point(s) are acquired (S14); it is determined based on the acquired positions and shapes of the respective branch points whether the adjacent prior branch point exists, the adjacent prior branch point being within the first distance from the guidance branch point and connected with a road in the same direction as the guidance branch point (S15); if it is determined that the adjacent prior branch point exists, the guidance end point is set to the position by the second distance before the adjacent prior branch point (S17); and the guidance for guidance branch point is provided such that the utterance of the guidance completes at a timing at which the vehicle is located at the set guidance end point (S9). Therefore, by setting the timing to complete the utterance of the guidance for guidance branch point to an appropriate timing, it is possible to prevent misidentification of the guidance branch point even when the guidance branch point is likely to be misidentified with another branch point.

In addition, among a plurality of guidance for guidance branch point, the guidance "To the left (right) direction at the further branch ahead." includes a phrase determining that the guidance branch point is a branch point located on the foremost side in the moving direction of the movable body among a plurality of branch points consecutively existing ahead of the movable body. Therefore, it is possible to make the user correctly determine the guidance branch point among the consecutive branch points even when branch points in the same shape are consecutively located.

In addition, if the vehicle travels on the main lane of a highway, the guidance for guidance branch point is provided such that the utterance of the guidance completes at a timing at which the vehicle is located at the guidance end point that is a position by a predetermined distance before the adjacent prior branch point. Therefore, it is possible to prevent a misidentification of the guidance branch point especially in a situation in which the vehicle moves at high speed and many branch points having similar shapes exist.

In addition, if the distance from the guidance branch point to the adjacent prior branch point is short, the guidance end point is changed toward the departure point side of the guidance route (S19). Therefore, it is possible to ensure a certain time period after the guidance completes and before the vehicle reaches the guidance branch point. As a result, it is possible to reduce possibility of misidentification of the guidance branch point and to make the user appropriately perform a preparation operation for the guidance branch point.

In addition, the guidance end point is changed to the preparation point especially if the distance from the guidance branch point to the adjacent prior branch point is equal to or shorter than the differential distance between the distance from the guidance branch point to the preparation point and the second distance. Therefore, in a situation in which it is predicted that the user cannot perform the preparation operation for the guidance branch point appropriately if the guidance end point is set to a position by the second distance before the adjacent prior branch point, it is possible to change the guidance end point to a position at which the user can appropriately perform the preparation operation for the guidance branch point.

In addition, if the consecutive prior branch point connected with a road in the same direction as the guidance branch point does not exist before the guidance end point, the guidance for guidance branch point is provided such that the utterance of the guidance completes at a timing at which the movable body is located at the guidance end point that is a position by the predetermined distance before the adjacent prior branch point. Therefore, it is possible to set the guidance end point to an appropriate position based on the adjacent prior branch point except the situation in which the possibility of misidentification of the guidance branch point increases by setting the guidance end point to the position based on the adjacent prior branch point.

In addition, if the consecutive prior branch point connected with a road in the same direction as the guidance branch point does not exist within the moving distance of the vehicle required to provide the utterance of the guidance for guidance branch point from the guidance end point, the guidance for guidance branch point is provided such that the utterance of the guidance completes at a timing at which the vehicle is located at the guidance end point that is a position by the predetermined distance before the adjacent prior branch point. Therefore, it is possible to avoid the situation in which the possibility of misidentification of the guidance branch point increases by setting the guidance end point to the position based on the adjacent prior branch point.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles.

For example, in the present example, the guidance for guidance branch point in the navigation device 1 is outputted by audio guidance from the speaker 16. However, the guidance may be performed by displaying sentences on the liquid crystal display 15.

In addition, in the present example, the guidance end point is set based on the position of the branch point. However, the guidance end point may be set based on a feature (for example, a stop line or a traffic signal) installed in the vicinity of the branch point.

In addition, in the present example, while the vehicle is traveling on the main lane of a highway, it is determined whether the adjacent prior branch point exists and the guidance end point is set to a position based on the adjacent prior branch point. However, it may be determined while the vehicle is traveling on a road other than the main lane of a highway. For example, it may be applied while the vehicle is traveling on a toll road or a national road.

In addition, in the present example, if the adjacent prior branch point exists, the guidance "To the left (right) direction at the further branch." is set. However, the contents of the phrase may be changed. However, it is preferable to include a phrase determining that the guidance branch point is the branch point located on the foremost side in the travel direction among a plurality of branch points consecutively existing ahead of the vehicle.

In addition, in the present example, when at least one adjacent prior branch point exists toward the guidance branch point located in the forward direction of the travel direction of the vehicle, the guidance end point is set to a position based on the adjacent prior branch point. However, when two or more adjacent prior branch points exist, the guidance end point may be set to a position based on the adjacent prior branch point.

In addition, the inventive principles may be applied to devices having a function that performs route guidance based on a guidance route, besides the navigation devices. For example, the inventive principles may be applied to portable terminals such as cellular phones, PDAs, and the like, personal computers, portable music players, and the like (hereinafter referred to as "portable terminals or the like"). In addition, the inventive principles may be applied to systems composed of servers and portable terminals or the like. In such case, the respective steps of the above-mentioned branch point guidance processing program (FIGS. 5 and 6) may be executed either a server or a portable terminal or the like. In addition, if the inventive principles are applied to the portable terminals or the like, travel guidance for movable bodies other than vehicles, for example, users of portable terminals or the like, two wheels, and the like may be performed.

What is claimed is:

1. A movement guidance system comprising:
   a memory that store branch point data; and
   a controller configured to:
      set a guidance route for guiding a movement of a movable body;
      set a guidance branch point on the guidance route, the guidance branch point being a branch point along the guidance route about which guidance will be given;
      acquire a position and a shape of the guidance branch point from the stored branch point data;
      acquire a position and a shape of a prior non-guidance branch point from the stored branch point data, the prior non-guidance branch point existing on a departure point side of the guidance route with respect to the guidance branch point, the prior non-guidance branch point being a branch point along the guidance route about which no guidance will be given;
      determine whether the prior non-guidance branch point is adjacent based on the acquired position and the shape of the guidance branch point and the acquired position and the shape of the prior non-guidance branch point, the prior non-guidance branch point being adjacent when the prior non-guidance branch point exists within a first predetermined distance from the guidance branch point and is connected with a road in a same direction as the guidance branch point; and
      when it is determined that the prior branch point is adjacent, provide verbal guidance for the guidance branch point that completes at a timing at which the movable body is located at a guidance end point that is located a second predetermined distance before the prior non-guidance branch point, the verbal guidance for the guidance branch point including a phrase indicating that the guidance branch point is a furthestmost branch point in a moving direction of the movable body among a plurality of branch points consecutively existing ahead of the movable body.

2. The movement guidance system according to claim 1, wherein the controller is configured to:
   acquire, from the memory, a road attribute of a road on which the movable body is located; and based on the acquired road attribute, when the movable body is located on a main lane of a highway, completes the verbal guidance at a timing at which the movable body is located at the guidance end point.

3. The movement guidance system according to claim 1, wherein the controller is configured to:
when a distance from the guidance branch point to the adjacent prior non-guidance branch point is equal to or shorter than a third predetermined distance, change the guidance end point toward the departure point side of the guidance route, the third predetermined distance being shorter than the first predetermined distance.

4. The movement guidance system according to claim 3, wherein:
the controller is configured to:
acquire a moving speed of the movable body; and
based on the acquired moving speed of the movable body, acquire a preparation point that is a position where the movable body will be located a predetermined time before the movable body reaches the guidance branch point; and
the third predetermined distance is a differential distance between a distance from the guidance branch point to the preparation point and the second predetermined distance.

5. The movement guidance system according to claim 4, wherein the controller is configured to:
change the guidance end point to the preparation point.

6. The movement guidance system according to claim 1, wherein the controller is configured to:
determine whether the prior non-guidance branch point is consecutive based on the acquired position and the shape of the prior non-guidance branch point, the prior non-guidance branch point being consecutive when the prior non-guidance branch point exists within a fourth predetermined distance from the guidance end point and is connected with a road in the same direction as the guidance branch point; and
when the prior non-guidance branch point is not consecutive, complete the guidance for the guidance branch point at a timing at which the movable body is located at the guidance end point.

7. The movement guidance system according to claim 6, wherein the controller is configured to:
acquire a moving speed of the movable body; and
acquire a required moving distance based on the acquired moving speed of the movable body, the required moving distance being a moving distance of the movable body required to provide the verbal guidance for the guidance branch point, the predetermined fourth distance being equal to the required moving distance.

8. The movement guidance system according to claim 1, wherein the system is incorporated into a navigation device.

9. A movement guidance method comprising:
setting a guidance route for guiding a movement of a movable body;
setting a guidance branch point on the guidance route, the guidance branch point being a branch point along the guidance route about which guidance will be given;
acquiring a position and a shape of the guidance branch point from stored branch point data;
acquiring a position and a shape of a prior non-guidance branch point from the stored branch point data, the prior non-guidance branch point existing on a departure point side of the guidance route with respect to the guidance branch point, the prior non-guidance branch point being a branch point along the guidance route about which no guidance will be given;
determining whether the prior non-guidance branch point is adjacent based on the acquired position and the shape of the guidance branch point and the acquired position and the shape of the prior non-guidance branch point, the prior non-guidance branch point being adjacent when the prior non-guidance branch point exists within a first predetermined distance from the guidance branch point and is connected with a road in a same direction as the guidance branch point; and
when it is determined that the prior branch point is adjacent, completing verbal guidance for the guidance branch point at a timing at which the movable body is located at a guidance end point that is located a second predetermined distance before the prior non-guidance branch point, the verbal guidance for the guidance branch point including a phrase indicating that the guidance branch point is a furthestmost branch point in a moving direction of the movable body among a plurality of branch points consecutively existing ahead of the movable body.

10. The movement guidance method according to claim 9, further comprising:
acquiring, from the memory, a road attribute of a road on which the movable body is located; and
based on the acquired road attribute, when the movable body is located on a main lane of a highway, completing the verbal guidance at a timing at which the movable body is located at the guidance end point.

11. The movement guidance method according to claim 9, further comprising:
when a distance from the guidance branch point to the adjacent prior non-guidance branch point is equal to or shorter than a third predetermined distance, changing the guidance end point toward the departure point side of the guidance route, the third predetermined distance being shorter than the first predetermined distance.

12. The movement guidance method according to claim 11, further comprising:
acquiring a moving speed of the movable body; and
based on the acquired moving speed of the movable body, acquiring a preparation point that is a position where the movable body will be located a predetermined time before the movable body reaches the guidance branch point;
wherein the third predetermined distance is a differential distance between a distance from the guidance branch point to the preparation point and the second predetermined distance.

13. The movement guidance method according to claim 12, further comprising:
changing the guidance end point to the preparation point.

14. The movement guidance method according to claim 9, further comprising:
determining whether the prior non-guidance branch point is consecutive based on the acquired position and the shape of the prior non-guidance branch point, the prior non-guidance branch point being consecutive when the prior non-guidance branch point exists within a fourth predetermined distance from the guidance end point and is connected with a road in the same direction as the guidance branch point; and when the prior branch point is not consecutive, completing the guidance for the guidance branch point at a timing at which the movable body is located at the guidance end point.

15. The movement guidance method according to claim 14, further comprising:

acquiring a moving speed of the movable body; and acquiring a required moving distance based on the acquired moving speed of the movable body, the required moving distance being a moving distance of the movable body required to provide the verbal guidance for the guidance branch point, the predetermined fourth distance being equal to the required moving distance.

16. The movement guidance method according to claim 14, wherein each step of the method is implemented by the controller of a navigation device.

17. A non-transitory computer-readable storage medium storing a computer-executable movement guidance program, the program comprising:

instructions for setting a guidance route for guiding a movement of a movable body;

instructions for setting a guidance branch point on the guidance route, the guidance branch point being a branch point along the guidance route about which guidance will be given;

instructions for acquiring a position and a shape of the guidance branch point from the stored branch point data;

instructions for acquiring a position and a shape of a prior non-guidance branch point from the stored branch point data, the prior non-guidance branch point existing on a departure point side of the guidance route with respect to the guidance branch point, the prior non-guidance branch point being a branch point along the guidance route about which no guidance will be given;

instructions for determining whether the prior non-guidance branch point is adjacent based on the acquired position and the shape of the guidance branch point and the acquired position and the shape of the prior non-guidance branch point, the prior non-guidance branch point being adjacent when the prior non-guidance branch point exists within a first predetermined distance from the guidance branch point and is connected with a road in a same direction as the guidance branch point; and instructions for when it is determined that the prior branch point is adjacent, completing verbal guidance for the guidance branch point at a timing at which the movable body is located at a guidance end point that is located a second predetermined distance before the prior non-guidance branch point, the verbal guidance for the guidance branch point including a phrase indicating that the guidance branch point is a furthestmost branch point in a moving direction of the movable body among a plurality of branch points consecutively existing ahead of the movable body.

* * * * *